United States Patent
Ramani et al.

(10) Patent No.: US 7,008,560 B2
(45) Date of Patent: Mar. 7, 2006

(54) SILICON CARBIDE-SUPPORTED CATALYSTS FOR PARTIAL OXIDATION OF NATURAL GAS TO SYNTHESIS GAS

(75) Inventors: Sriram Ramani, Ponca City, OK (US); David M. Minahan, Stillwater, OK (US); Yi Jiang, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 225 days.

(21) Appl. No.: 10/364,173

(22) Filed: Feb. 10, 2003

(65) Prior Publication Data

US 2004/0157939 A1 Aug. 12, 2004

(51) Int. Cl.
  *C01B 3/26* (2006.01)
  *B01J 27/224* (2006.01)

(52) U.S. Cl. ............................ 252/373; 502/178
(58) Field of Classification Search ................ 252/373
  See application file for complete search history.

(56) References Cited

U.S. PATENT DOCUMENTS

| | | | |
|---|---|---|---|
| 3,850,844 A | 11/1974 | Takeo et al. ................ 252/429 |
| 4,758,375 A | 7/1988 | Brophy et al. | |
| 4,914,070 A | 4/1990 | Ledoux et al. .............. 502/178 |
| 4,940,684 A | 7/1990 | Okutani et al. | |
| 5,792,719 A | 8/1998 | Eberle et al. ............... 502/178 |
| 5,980,843 A | 11/1999 | Silversand .................. 423/210 |
| 6,087,545 A | 7/2000 | Choudhary et al. ......... 585/658 |
| 6,184,178 B1 | 2/2001 | Balauais et al. | |
| 6,211,255 B1 | 4/2001 | Schanke et al. ............ 518/715 |
| 6,254,807 B1 * | 7/2001 | Schmidt et al. ............ 252/373 |
| 6,402,989 B1 * | 6/2002 | Gaffney ...................... 252/373 |
| 6,409,940 B1 * | 6/2002 | Gaffney et al. ............. 252/373 |
| 2003/0009943 A1 * | 1/2003 | Millet et al. ............... 48/198.3 |

FOREIGN PATENT DOCUMENTS

WO  WO00 62926  10/2000

OTHER PUBLICATIONS

PCT International Search Report for Application No. PCT/US04/03705, dated Aug. 5, 2004 (3 p.).

Deutschmann et al., *Natural Gas Conversion in Monolithic Catalysts: Interaction of Chemical Reactions and Transport Phenomena*, Studies in Surface Science and Catalysis (2001) pp. 251–258, no month.

* cited by examiner

*Primary Examiner*—Wayne A. Langel
(74) *Attorney, Agent, or Firm*—Conley Rose P.C.

(57) ABSTRACT

A method for converting light hydrocarbons (e.g. methane or natural gas) to synthesis gas employs a silicon carbide-supported catalyst that catalyzes a net partial oxidation reaction. Certain preferred catalysts include a catalytically active metal disposed on a silicon carbide support.

36 Claims, No Drawings

SILICON CARBIDE-SUPPORTED CATALYSTS FOR PARTIAL OXIDATION OF NATURAL GAS TO SYNTHESIS GAS

BACKGROUND OF THE INVENTION

1. Field of the Invention

The present invention generally relates to catalysts and processes for catalytically converting light hydrocarbons (e.g., natural gas) to synthesis gas. More particularly, the invention relates to silicon carbide-supported catalysts that are active for catalyzing the net partial oxidation of methane to CO and $H_2$.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes. Present day industrial use of methane as a chemical feedstock typically proceeds by the initial conversion of methane to carbon monoxide and hydrogen by either steam reforming, which is the most widely used process, or by dry reforming. Steam reforming proceeds according to Equation 1.

$$CH_4 + H_2O \rightleftharpoons CO + 3H_2 \qquad (1)$$

Although steam reforming has been practiced for over five decades, efforts to improve the energy efficiency and reduce the capital investment required for this technology continue.

The partial oxidation of hydrocarbons, e.g., natural gas or methane is another process that has been employed to produce syngas. While currently limited as an industrial process, partial oxidation has recently attracted much attention due to significant inherent advantages, such as the fact that significant heat is released during the process, in contrast to the steam reforming processes, which are endothermic. Partial oxidation of methane proceeds exothermically according to the following reaction stoichiometry:

$$CH_4 + \tfrac{1}{2}O_2 \rightarrow CO + 2H_2 \qquad (2)$$

In the catalytic partial oxidation processes, natural gas is mixed with air, oxygen or oxygen-enriched air, and is introduced to a catalyst at elevated temperature and pressure. The partial oxidation of methane yields a syngas mixture with a $H_2$:CO ratio of 2:1, as shown in Equation 2. This ratio is more useful than the $H_2$:CO ratio from steam reforming for the downstream conversion of the syngas to chemicals such as methanol and to fuels. Furthermore, oxidation reactions are typically much faster than reforming reactions. This makes possible the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by the existing catalytic partial oxidation processes have placed these processes generally outside the limits of economic justification.

A number of process regimes have been described in the literature for the production of syngas via catalyzed partial oxidation reactions. The noble metals, which typically serve as the best catalysts for the partial oxidation of methane, are scarce and expensive. The more widely used, less expensive, catalysts have the disadvantage of promoting coke formation on the catalyst during the reaction, which results in loss of catalytic activity. Moreover, in order to obtain acceptable levels of conversion of gaseous hydrocarbon feedstock to CO and $H_2$ it is typically necessary to operate the reactor at a relatively low flow rate, or space velocity, using a large quantity of catalyst. For successful operation at commercial scale, however, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance.

As a result, substantial effort has been devoted in the art to the development of economical catalysts allowing commercial performance without coke formation. Not only is the choice of the catalyst's chemical composition important, the physical structure of the catalyst and catalyst support structures must possess mechanical strength, in order to function under operating conditions of high pressure, high temperature and high flow rate of the reactant and product gasses.

Of the methods that employ catalysts for oxidative conversion of methane to syngas, typically catalytic metals are dispersed throughout a ceramic oxide support. Ceramic oxides however, are known to have relatively low thermal conductivities. This poses a problem because the formation of hot spots, in which the temperature is higher than in the remaining part of the catalyst bed, can occur. These hot spots give rise to secondary reactions such as the total combustion of the starting material or lead to the formation of undesired by-products, which can be separated from the reaction product only with great difficulty, if at all. In addition, formation of secondary products decreases the overall efficiency of the desired process, and leads to significant increase in costs. The formation and maintenance of hot spots can also increase the rate of catalyst deactivation and decrease the catalyst life.

Accordingly, there is a continuing need for better, more economical processes and catalysts for the catalytic partial oxidation of hydrocarbons, particularly methane, or methane containing feeds, in which the catalyst retains a high level of activity and selectivity to carbon monoxide and hydrogen under conditions of high gas space velocity and elevated pressure.

SUMMARY OF THE INVENTION

In order to operate at very high flow rates, high pressure and using short contact time CPOX reactors, the catalysts should be highly active, have excellent mechanical strength, resistance to rapid temperature fluctuations and thermal stability at partial oxidation reaction temperatures.

The catalysts and methods of the present invention overcome some of the drawbacks of existing catalysts and processes for converting light hydrocarbons to syngas. The new silicon carbide-supported catalysts are more stable and give comparable syngas yield to conventional syngas catalysts under conditions of high gas space velocity and elevated pressure. Another advantage provided by the preferred new catalysts and processes is that they are economically feasible for use under commercial-scale conditions with little or no increase in capital cost.

In accordance with a preferred embodiment of the present invention, a method of coverting a $C_1$–$C_5$ hydrocarbon to a product gas mixture containing CO and $H_2$ includes contacting a reactant gas mixture containing the hydrocarbon and a source of oxygen with a catalytically effective amount of a silicon carbide-supported catalyst in the reaction zone of a syngas production reactor such that a portion of reactant gas mixture flowing over the catalyst is in contact with the catalyst for no more than approximately 200 milliseconds and maintaining catalytic partial oxidation (CPOX) promoting conditions during the contacting such that a net partial oxidation reaction is catalyzed by the catalyst. The catalyst is preferably employed in the reaction zone of a millisecond contact time syngas production reactor. The silicon carbide-supported catalyst contains a catalytically active metal and a silicon carbide support. The term "maintaining CPOX promoting conditions" refers to regulating hydrocarbon feedstock composition, pressure, space velocity and catalyst temperature and contact time such that the partial oxidation reaction of Equation (2) is favored when methane is employed as the hydrocarbon.

These and other embodiments, features and advantages of the present invention will apparent with reference to the following description.

DETAILED DESCRIPTION OF PREFERRED EMBODIMENTS

The present invention comprises a new family of syngas production catalysts having silicon carbide supports. Certain preferred embodiments are described in the following representative examples. The present catalysts are capable of catalytically converting $C_1$–$C_5$ hydrocarbons (e.g., methane or natural gas) to synthesis gas containing CO and $H_2$. They are preferably supported on any of various three-dimensional structures such as particulates including, but not limited to, balls, noodles, powders, pills, and pellets.

The inventors demonstrate that new silicon carbide-supported structures, when prepared as described herein, are highly active syngas production catalysts with sufficient mechanical strength to withstand high pressures and temperatures and permit a high flow rate of reactant and product gases when employed on-stream in a short contact time reactor for synthesis gas production. The inventors also demonstrate that using modeling methods, significant improvement in syngas selectivity can be achieved at elevated pressures and short contact times by using silicon-carbide supported catalysts. Without wishing to be restricted to a particular theory, the inventors believe that the high thermal conductivity of the silicon carbide support serves to minimize the number of hot spots, which in turn, serves to limit secondary reactions (i.e. the water gas shift), while maintaining a sufficient crush strength. Crush strength, also known as mechanical strength, is herein defined as the load at which the catalyst physically breaks.

The water gas shift (WGS) proceeds according to Equation 3.

$$CO + H_2O \Leftrightarrow CO_2 + H_2 \quad (3)$$

Because silicon carbide dissipates the heat formed from Equation 2, the WGS is prevented from equilibrating. This results in a higher product selectivity (i.e. $CO/H_2$), or a more selective catalyst. Additionally, by maintaining a lower temperature in the system as a result of hot spot formation, the amount of catalytically active metals volatilizing may be reduced.

As is known, silicon carbide (SiC) is composed of tetrahedra of carbon and silicon atoms with strong bonds in the crystal lattice. These strong bonds produce a very tough material. For example, SiC is not attacked by any acids or alkalis or molten salts up to 800° C. In air, SiC forms a protective silicon oxide coating at 1200° C. and can be used up to 1600° C. The high thermal conductivity coupled with low thermal expansion and high strength give SiC exceptional thermal shock resistant qualities.

Key properties of SiC include high strength, low thermal expansion, high thermal conductivity, high hardness, excellent thermal shock resistance, and superior chemical inertness. In addition, SiC has a very high decomposition temperature (>2000° C.) and is stable in oxidizing atmospheres up to temperatures above 1400° C.

Catalyst System

It will be understood that the selection of a catalyst or catalyst system requires many technical and economic considerations. Key catalyst properties include high activity, high selectivity, high recycle capability and filterability. A catalyst's performance is determined mainly by its active metal components. For example, a catalytic metal might be chosen based both on its ability to complete the desired reaction and its inability to complete an unwanted reaction. Suitable catalytically active metals known to aid in syngas conversion including Ti, V, Cr, Mn, Fe, Co, Ni, Ru, Rh, Pd, W, Re, Os, Ir, Pt, Au, and any combinations thereof may be used to coat the supports of the present invention. In a preferred embodiment, the catalytically active metal is Rh or Ir. Additionally, rare-earth oxides may be used to improve the dispersion of catalytic metals on the supports.

A support preferably favorably influences any of the catalyst activity, selectivity, recycling, refining, material handling, reproducibility and the like. Properties of a support include surface area, pore volume, pore size distribution, particle size distribution, attrition resistance, acidity, basicity, impurity levels, and the ability to promote metal-support interactions. Metal dispersion increases with support surface area. Support porosity influences metal dispersion and distribution, metal sintering resistance, and intraparticle diffusion of reactants, products and poisons. Smaller support particle size increases catalytic activity but decreases filterability. The support preferably has desirable mechanical properties, attrition resistance and hardness. For example, an attrition resistant support allows for multiple catalyst recycling and rapid filtration. Further, support impurities preferably are inert. Alternatively, the support may contain promoters that enhance catalyst selectivity and performance. Suitable promoters may include, for example, a lanthanide. Preferably the lanthanide is Pr, Nd, Pm, Sm, Eu, Gd, Tb, Dy, Ho, Er, Tm or Yb, more preferably Pr, Sm, and Yb as set forth in PCT Application PCT/US01/27450, which corresponds to published U.S. application 2002-0115730, entitled "Lanthanide-promoted Rhodium Catalysts and Process for Producing Synthesis Gas," incorporated herein by reference in its entirety for all purposes.

For efficient syngas production, the use of elevated operation pressures may be preferred in order to ensure the direct transition to a downstream process, such as a Fischer-Tropsch process, without the need for intermediate compression.

The support structure of these catalysts can be in the form of divided or discrete structures or particulates. The terms "distinct" or "discrete" structures or particulates, as used herein, refer to supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than six millimeters, preferably less than three millimeters. According to some embodiments, the divided catalyst structures have a diameter or longest characteristic dimension of about 0.25 mm to about 6.4 mm (about 1/100" to about 1/4"), preferably between about 0.5 mm and about 4.0 mm. In other embodiments they are in the range of about 50 microns to 6 mm. Small support particles tend to be more useful in fluidized beds. The use of larger particulates such as granules, pills or spheres with larger than 1 mm in largest dimension, may aid in preventing blowouts and blowbacks by a providing a smaller pressure drop in the catalyst bed. Because relative surface area decreases as particle size increases, less catalytic metal is needed to coat the supports, and therefore the cost of the catalyst is reduced.

Blowouts occur when the space velocity within a reactor is too high and the majority of particles contacting the reactant stream are located at the end (or bottom) of the reactor. Conversely, blowbacks occur when the space velocity within a reactor is too low and the majority of particles contacting the reactant stream are located at the front (or top) of the reactor. Both of these situations are undesirable because they create a large temperature profile within the reactor and inefficiently make use of the catalyst system, resulting in poor conversion.

Catalytic particles may be made according to methods known in the art such as deposition, precipitation, impregnation, spray drying, and the like. The following examples are offered by way of illustration, and not by way of limitation. Those skilled in the art will recognize that variations of the invention embodied in the examples can be made, especially in light of the teachings of the various references cited herein, the disclosures of which are incorporated by reference.

The invention is presented in the following sections in terms of reaction system simulation results and experimental data. It must be noted that the conditions used in the simulation are similar to the experiments but not exactly the same. The inventors believe that by using simulation to guide experimental work, significant improvements can be achieved.

Simulation Results

Background of the Simulation Work

Deutschmann et al, in "Natural gas conversion in monolithic catalysts: Interaction of chemical reactions and transport phenomena", 6$^{th}$ National Gas Conversion Symposium, Girdwood, USA (2001), predicted that the hot spot in a monolithic syngas reactor, the catalyst surface temperature can be as high as 2000 K. This hot spot can cause active phase transformation and/or sinter the catalyst, causing a loss of surface area and, consequently, a loss of catalytic activity. This loss of catalytic activity can, in turn, lead to an increase in the rate of unselective reaction, causing faster heat liberation and an even quicker deactivation of the catalyst, thus perpetuating a spiral of deactivation. Thus, there is a desire to limit the presence of and moderate the intensity of hot spots in the reaction zone.

Simulation of Present Systems

In modern chemical engineering, a chemical process can be accurately simulated with complex modeling software with detailed implementations of species mass and energy transports. In this patent application, the invention is demonstrated with the well-approved numerical reactor-modeling tool. The syngas reactions are modeled by detailed kinetics schemes for homogeneous as well as heterogeneous reaction mechanisms on rhodium (Deutschmann et al., 2001). The mechanism consists of 25 gas phase species with 136 reactions; 12 surface species with 44 surface reactions. In the syngas reactor model, the governing equations of flow field and multi-species mass and heat transports have been solved through a computational fluid dynamics (CFD) approach. The details of this model and the approach are available in literature (Deutschmann et al., 2001). The outputs of this model are two-dimensional flow, pressure, temperature and species concentration fields.

With some modification of the above-mentioned model, a syngas process using a packed bed reactor can be simulated. The modeling results agreed very well with the literature experimental data.

This rigorous reactor model has been applied to numerically study the impact of supported-catalyst thermal conductivity on axial temperature profiles, which further affect the reactor performance. The catalyst with high thermal conductivity can promote the syngas performance in terms of conversion of reactants and the selectivity of the desired products.

As an example, the following conditions are used to model the syngas reactor:

Catalyst bed length=L in

Packed-bed diameter=D in

Particle size=1.0 mm

Feed temperature=573.15 K

Superficial velocity=2.0 ft/s

Operation pressure=150 Psig

Feed $O_2/CH_4$ molar ratio=0.53

Case I ($Al_2O_3$ substance): thermal conductivity $\lambda$=36 W/m/K at 25° C. (Perry's Chemical Engineers' Handbook)

Case II: (SiC substance): thermal conductivity $\lambda$=490 W/m/K at 25° C. (Perry's Chemical Engineers' Handbook)

TABLE 1

The modeled syngas reactor performance

| Case number | I | II |
|---|---|---|
| $CH_4$ conversion % | 92.03 | 93.35 |
| CO selectivity % | 84.52 | 94.84 |
| $H_2$ selectivity % | 87.23 | 95.72 |
| $CO_2$ selectivity % | 5.43 | 4.79 |
| $C_2H_4$ selectivity % | 3.02 | 0.17 |
| $C_2H_2$ selectivity % | 7.31 | 0.29 |

This model was able to predict the syngas performance with catalyst with different support materials as summarized in Table 1. By using a support with a better thermal conductivity, the methane conversion was increased from 92% to 93%, hydrogen selectivity increased from 87% to 96%, CO selectivity increased from 84 to 95%, ethylene selectivity decreased from 7.3% to 0.3%, in Case I versus Case II. This clearly demonstrated the advantage of using better heat-conduction support such as silicon carbide.

Experimental Results

The principles of the present invention were tested in a series of experiments as follows:

EXAMPLES 1–4

Ex.1: 2 wt % Rh supported on 12-mesh SiC pills.
Ex.2: 2 wt % Rh supported on 20-mesh SiC pills.
Ex.3: 4 wt % Rh supported on 12-mesh SiC pills.
Ex.4: 4 wt % Rh supported on 20-mesh SiC pills.

Synthesis Procedure:

Ex.1.2 wt % Rh on 12-mesh SiC granules:

a. To 10 grams of 12-mesh SiC support, 2 wt % Rh was added using Rh-chloride precursor (which contains 41.1 wt % Rh) in water solution as follows: Rh-chloride was dissolved in distilled and de-ionized (DDI) water at about 80° C. on hotplate, added to SiC support, mixed well and dried at ~70° C. for 4 hours on hotplate with frequent stirring.

b. This was followed by drying in an oven with air flow at 90° C. for 48 hours.

c. After drying, the sample was calcined at 125° C./1 h, 250° C./1 h and 500° C./3 h using 3° C./min ramp rate in a muffle furnace with air flow.

d. After calcination, the sample was reduced at 125° C./0.5 h and 500° C./1.5 h using 5° C./min ramp with 1:1 $N_2$:$H_2$ flow at a total flowrate of 0.6 standard liter per minute.

Ex. 2, Ex. 3 and Ex. 4 were prepared the same way, but with corresponding changes in Rh wt % or SiC particle size. The details are shown in Table 2.

TABLE 2

| Example | SiC particle size | Rh wt % loading | SiC weight (grams) | Weight after reduction (grams) |
|---|---|---|---|---|
| 1 | 12 mesh (1.68 mm) | 2% | 10.0024 | 10.1162 |
| 2 | 20 mesh (0.841 mm) | 2% | 10.0028 | 10.1005 |
| 3 | 12 mesh | 4% | 10.0023 | 10.2260 |
| 4 | 20 mesh | 4% | 10.0081 | 10.2649 |

Test Procedure

Representative silicon carbide-supported catalysts were evaluated for their ability to catalyze the hydrocarbon partial oxidation reaction in a conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a $CH_4$:$O_2$ molar ratio of 1.8–2:1 with a combined flow rate of 3.5 standard liters per minute (SLPM), corresponding to a gas hourly space velocity of 174,000 $hr^{-1}$ and at a pressure of 5 psig (136 kPa). Methane is pre-heated so that the reactant gas mixture reaches a temperature of about 300° C. before contacting the catalyst bed. The reactor effluent was analyzed using a gas chromatograph equipped with a thermal conductivity detector. The results are shown below in Table 3.

TABLE 3

| Ex. | $CH_4$:$O_2$ molar ratio | $CH_4$/$O_2$ conversion (%) | CO/$H_2$ Selectivity (%) | $H_2$:CO molar ratio |
|---|---|---|---|---|
| 1 | 1.8 | 61/100 | 69/50 | 1.4 |
| 2 | 2.1 | 68/100 | 60/50 | 1.7 |
| 2 | 1.8 | 77/100 | 58/51 | 1.7 |
| 3 | 2.1 | 65/100 | 63/51 | 1.6 |
| 3 | 1.8 | 71/100 | 63/52 | 1.7 |
| 4 | 2.1 | 51/99 | 64/49 | 1.5 |
| 4 | 1.8 | 58/100 | 67/53 | 1.6 |

It can be seen from Table 3 that as the fuel:oxygen ratio decreases (from 2.1 to 1.8), methane conversion increases as expected but CO and $H_2$ selectivities show small increase or no change. As the support particle size decreases (from 12 mesh to 20 mesh), methane conversion decreases but CO and $H_2$ selectivities show small increase or no change. Without being bound by any theory, the inventors believe that by optimizing the combination of particle size, fuel:oxygen ratio and active metal loading, performance of the SiC supported system can be enhanced to the levels shown through the simulation results.

It is apparent as shown in Table 4 that the higher thermal conductivity (TC) and lower coefficient of thermal expansion (CTE) of SiC supports compared to the conventional catalyst supports such as alumina ($Al_2O_3$) supports and zirconia ($ZrO_2$) supports provide the higher thermal shock resistance desired in such short contact time exothermal reactions. For these reasons, the present materials, which possess high thermal conductivities greater than 40 W/mK at 25° C., preferably greater than 100 W/mK at 25° C. and coefficients of thermal expansion preferably lower than about $7 \times 10^{-6}$/° C. at 25° C., more preferably lower than about $5 \times 10^{-6}$/° C. at 25° C., can be used to improve syngas performance.

TABLE 4

Comparison of Thermal Conductivity and Coefficient Of Thermal Expansion for SiC, $Al_2O_3$ and $ZrO_2$ supports at 25° C.

|  | Thermal Conductivity (W/mK) | Coeff. Of Thermal Expansion (° C.$^{-1}$) |
| --- | --- | --- |
| SiC | 120 | $4 \times 10^{-6}$ |
| $Al_2O_3$ | 18 | $8.1 \times 10^{-6}$ |
| $ZrO_2$ | 2 | $10.3 \times 10^{-6}$ |

Process of Producing Synthesis Gas

For the production of syngas, any suitable reaction regime may be applied in order to contact the reactants with one of the new silicon carbide-supported catalysts described above. One suitable regime is a fixed bed reaction regime, in which the catalyst is retained within a reaction zone in a fixed arrangement, using fixed bed reaction techniques that are well known and have been described in the literature. A hydrocarbon and $O_2$-containing reactant gas mixture is contacted with one of the present silicon carbide-supported catalysts in a reaction zone maintained at partial oxidation-promoting conditions of temperature, pressure and flow rate effective to produce an effluent stream comprising carbon monoxide and hydrogen. Preferably a short or millisecond contact time reactor is employed. Several schemes for carrying out catalytic partial oxidation (CPOX) of hydrocarbons in a short contact time reactor have been described in the literature. For example, L. D. Schmidt and his colleagues at the University of Minnesota have described a millisecond contact time reactor for production of synthesis gas by direct oxidation of methane over a catalyst such as platinum, rhodium or nickel (U.S. Pat. No. 5,648,582; J. Catalysis (1992) 138, 267–282; and WO99/35082). A general description of major considerations involved in operating a reactor using millisecond contact times is given in U.S. Pat. No. 5,654,491. The teachings of those references are incorporated herein.

Preferably a hydrocarbon-containing gas such as methane or natural gas and an $O_2$-containing feedstock are combined to provide the reactant gas mixture. Other light hydrocarbons having from 2 to 5 carbon atoms, and mixtures thereof, also serve as satisfactory feedstocks. The $O_2$ containing feedstock is preferably substantially pure oxygen gas, but it may also be air or $O_2$-enriched air. In addition, the oxygen-containing gas may also comprise steam and/or $CO_2$ in addition to oxygen. The reactant gas mixture is fed into a reactor where it comes into contact with a catalytically effective amount of a silicon carbide-supported catalyst. Representative catalysts are described in the foregoing Examples. The reactant gas mixture passes over the catalyst at a gas hourly space velocity of at least about 20,000 hr$^{-1}$, which corresponds to a weight hourly space velocity (WHSV) of about 200 hr$^{-1}$, when the reactor is operated to produce synthesis gas. The hydrocarbon feedstock and/or the oxygen-containing gas may be pre-heated before contacting the catalyst, preferably the reactant gas mixture is pre-heated to a temperature of about 150–700° C., more preferably about 200–400° C. Catalytically inert porous ceramic foam monoliths are preferably placed before and after the catalyst as radiation shields. The inlet radiation shield also typically aids in uniform distribution of the feed gases into the catalyst zone.

The reactant gas mixture passes over the catalyst and the catalytic materials are heated to the point at which they initiate and start the reaction. An autothermal net catalytic partial oxidation reaction preferably ensues, and the reaction conditions are managed so as to promote continuation of the autothermal process. For the purposes of this disclosure, the term "net partial oxidation reaction" means that the partial oxidation reaction shown in Reaction (2), above, predominates. However, other reactions such as steam reforming (see Reaction 1), dry reforming (Reaction (4)) and/or water-gas shift (see Reaction (3)) may also occur to a lesser extent.

$$CH_4 + CO_2 \leftrightarrow 2CO + 2H_2 \qquad (4)$$

The relative amounts of the CO and $H_2$ in the reaction product mixture resulting from the catalytic net partial oxidation of the methane, or natural gas, and oxygen feed mixture are about 2:1 $H_2$:CO, similar to the stoichiometric amounts produced in the partial oxidation reaction of Reaction (2). As the preheated feed gas mixture passes over the catalyst to the point at which they ignite, an autothermal net partial oxidation reaction ensues. Preferably, the reaction conditions are maintained to promote continuation of the autothermal net catalytic partial oxidation process.

For the purposes of this disclosure, "autothermal" means that after catalyst ignition, no additional heat must be supplied to the catalyst in order for the production of synthesis gas to continue. Autothermal reaction conditions are promoted by optimizing the concentrations of hydrocarbon and $O_2$ in the reactant gas mixture, preferably within the range of about a 1.5:1 to about 2.3:1 molar ratio of carbon::molecular oxygen (C:$O_2$). The hydrocarbon:oxygen ratio is an important variable for maintaining the autothermal reaction and the desired product selectivities, although maintaining the desired temperature, for example, may in some instances require variation of the carbon:oxygen ratio. Pressure, residence time, amount of feed preheat and amount of nitrogen dilution, if used, also affect the reaction products. The process preferably includes maintaining a catalyst residence time of no more than approximately 200 milliseconds (ms), preferably not more than about 20 ms, still more preferably not more than about 10 ms for the reactant gas mixture. This is accomplished by passing the reactant gas mixture over the catalyst at a gas hourly space velocity of about 20,000–100,000,000 h$^{-1}$, preferably about 50,000–10,000,000 h$^{-1}$. This range of preferred gas hourly space velocities corresponds to a weight hourly space velocity of about 500 to 60,000 hr$^{-1}$. Under near optimal reaction conditions, a preferred catalyst catalyzes the net partial oxidation of at least 90% of a methane feedstock to CO and $H_2$ with a selectivity for CO and $H_2$ products of at least about 90% CO and 90% $H_2$. Maintaining autothermal reaction promoting conditions may include keeping the temperature of the catalyst at about 600–2,000° C., and preferably between about 600–1,600° C., and maintaining a reactant gas pressure of about 100–12,500 kPa, preferably about 130–10,000 kPa, while contacting the catalyst. Near ideal operating conditions also include mixing a hydrocarbon-containing feedstock and an $O_2$-containing feedstock together in a carbon: molecular oxygen (C:$O_2$) molar ratio of about 1.25:1 to about 3.3:1, more preferably about 1.3:1 to about 2.2:1, still more preferably about 1.5:1 to about 2.2:1, and yet still more preferably about 2:1. Preferably the hydrocarbon-containing feedstock is at least about 50% methane by volume, more preferably at least 80% methane. Natural gas is mostly methane, but it can also contain up to about 25 mole % ethane, propane, butane and higher hydrocarbons. The new syngas generation process is suitable for the conversion of gas from naturally occurring reserves of methane, which can also contain carbon dioxide, nitrogen, hydrogen sulfide, and other minor components. The product gas mixture emerging from the reactor preferably has a $H_2:CO$ ratio between about 1.3:1 and about 2.2:1, more preferably between 1.4:1 to about 2.2:1, still more preferably a $H_2:CO$ approaching the desired Fischer-Tropsch syngas feed $H_2:CO$ ratio of about 2:1. Advantageously, certain preferred embodiments of the process are capable of operating at superatmospheric reactant gas pressures (preferably in excess of 2 atmospheres or about 200 kPa) to efficiently produce synthesis gas.

While the preferred embodiments of the invention have been shown and described, modifications thereof can be made by one skilled in the art without departing from the spirit and teachings of the invention. The embodiments described herein are exemplary only, and are not intended to be limiting. For example, pure methane was employed in the representative test procedures, however, any light hydrocarbon (i.e., $C_1$–$C_5$) gaseous feedstock could also serve as a feedstock for the catalytic partial oxidation reaction catalyzed by the new silicon carbide-supported catalysts. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications, and publications cited herein are incorporated by reference.

What is claimed is:

1. A process for the production of synthesis gas, comprising:
    contacting a reactant gas comprising light hydrocarbons and an oxygen-containing gas with a catalyst comprising a catalytically active metal on a support material, wherein the support material has a thermal conductivity greater than 40 W/mK at 25° C.

2. The process of claim 1 wherein the support material has a thermal conductivity greater than 100 W/mK at 25° C.

3. The process of claim 1 where the support material has a coefficient of thermal expansion less than $7*10^{-6}/°$ C.

4. The process of claim 1 where the support material coefficient of thermal expansion is less than $5*10^{-6}/°$ C.

5. A method of converting a $C_1$–$C_5$ hydrocarbon to a product gas mixture comprising CO and $H_2$, the method comprising:
    contacting a reactant gas mixture comprising the hydrocarbon and a source of molecular oxygen with a catalytically effective amount of a catalyst in the reaction zone of a syngas production reactor at a gas hourly space velocity in excess of about 20,000 $hr^{-1}$, the catalyst comprising a catalytically active metal disposed on a plurality of discrete structures of a silicon carbide support material, wherein the support material has a thermal conductivity greater than 40 W/mK at 25° C.; and
    maintaining catalytic partial oxidation (CPOX) promoting conditions during the contacting such that a net partial oxidation reaction is catalyzed by the catalyst.

6. The process of claim 5 wherein the support material has a thermal conductivity greater than 100 W/mK at 25° C.

7. The process of claim 5 where the support material has a coefficient of thermal expansion less than $7*10^{-6}/°$ C. at 25° C.

8. The method of claim 5 wherein the discrete structures are particulates.

9. The method of claim 5 wherein the plurality of discrete structures comprises at least one geometry chosen from the group consisting of powders, particles, pellets, granules, spheres, beads, pills, balls, noodles, cylinders, extrudates and trilobes.

10. The method of claim 5 wherein at least a majority of the discrete structures each have a maximum characteristic length of less than six millimeters.

11. The method of claim 10 wherein the majority of the discrete structures are generally spherical with a diameter of less than about 3 millimeters.

12. The method of claim 5 wherein the contacting comprises contacting a reactant gas mixture at a space velocity in excess of about 100,000 $h^{-1}$.

13. The method of claim 5 wherein the step of maintaining the catalyst at CPOX promoting conditions during the contacting includes maintaining a temperature of about 600–2000° C.

14. The method of claim 13 wherein the step of maintaining CPOX promoting conditions comprises maintaining a temperature of about 700–1,600° C.

15. The method of claim 5 wherein the step of maintaining CPOX promoting conditions during the contacting includes maintaining a gas pressure of about 100–12,500 kPa.

16. The method of claim 5 wherein the step of maintaining CPOX promoting conditions during the contacting includes maintaining a gas pressure of about 130–10,000 kPa.

17. The method of claim 5, further comprising mixing a methane-containing feedstock and an $O_2$-containing feedstock to provide a reactant gas mixture feedstock having a carbon: molecular oxygen molar ratio of about 1.25:1 to about 3.3:1.

18. The method of claim 17 wherein the mixing provides a reactant gas mixture feed having a $C:O_2$ molar ratio of about 1.3:1 to about 2.2:1.

19. The method of claim 18 wherein the mixing provides a reactant gas mixture feed having a $C:O_2$ molar ratio of about 1.5:1 to about 2.2:1.

20. The method of claim 19 wherein the mixing provides a reactant gas mixture feed having a $C:O_2$ molar ratio of about 2:1.

21. The method of claim 20 wherein the oxygen-containing gas further comprises steam, $CO_2$, or a combination thereof.

22. The method of claim 5 further comprising combining steam and/or $CO_2$ with the hydrocarbon feedstock.

23. The method of claim 5 wherein the $C_1$–$C_5$ hydrocarbon comprises at least about 50% methane by volume.

24. The method of claim 23 wherein the $C_1$–$C_5$ hydrocarbon comprises at least about 80% methane by volume.

25. The method of claim 5 further comprising preheating the reactant gas mixture.

26. The method of claim 5, further comprising passing the reactant gas mixture over the catalyst at a space velocity of about 20,000 to about 100,000,000 $h^{-1}$.

27. The method of claim 26 wherein the step of passing the reactant gas mixture over the catalyst comprises passing the mixture at a space velocity of about 50,000 to about 50,000,000 $h^{-1}$.

28. The method of claim 5, further comprising maintaining autothermal reaction promoting conditions during the contacting step.

29. The process of claim 5 where the support material has a coefficient of thermal expansion less than $5*10^{-6}/°$ C. at 25° C.

30. A method of converting a $C_1$–$C_5$ hydrocarbon feedstock comprising at least about 50 vol % methane to a product gas mixture comprising CO and $H_2$, the method comprising:

mixing a gaseous $C_1$–$C_5$ hydrocarbon-containing feedstock and an $O_2$-containing feedstock to provide a reactant gas mixture having a C:$O_2$ molar ratio of about 1.25:1 to about 3.3:1;

passing the reactant gas mixture over a catalytically effective amount of a catalyst in the reaction zone of a reactor at a gas hourly space velocity in excess of about 20,000 hr$^{-1}$, the catalyst comprising a catalytically active metal disposed on a plurality of discrete structures of a silicon carbide support material, wherein the support material has a thermal conductivity greater than 40 W/mK at 25° C.;

during the contacting, maintaining the catalyst at a temperature of about 600–2,000° C.;

during the contacting, maintaining the reactant gas mixture at a pressure of about 100–12,500 kPa; and during the contacting, adjusting the hydrocarbon and the oxygen concentration in the reactant gas mixture feedstock to a C:$O_2$ molar ratio of about 1.25:1 to about 3.3:1, such that the CPOX reaction is favored.

31. The process of claim 30 wherein the support material has a thermal conductivity greater than 100 W/mK at 25° C.

32. The process of claim 30 where the support material has a coefficient of thermal expansion less than 7*10$^{-6}$/° C. at 25° C.

33. The method of claim 30 wherein the catalyst comprises a structure chosen from the group consisting of powders, particles, pellets, granules, spheres, beads, pills, balls, noodles, cylinders, extrudates and trilobes.

34. The method of claim 30 wherein the catalyst comprises sufficient mechanical strength to withstand an on-stream pressure of at least about 100 kPa, a space velocity of at least 20,000 h$^{-1}$ when employed in the catalyst bed of a short contact time syngas production reactor.

35. The method of claim 30 wherein the catalyst comprises sufficient thermal stability to resist decomposition at temperatures up to at least about 1,200° C.

36. The process of claim 30 where the support material has a coefficient of thermal expansion less than 5*10$^{-6}$/° C. at 25° C.

* * * * *